United States Patent [19]

Fogler et al.

[11] Patent Number: 4,740,488
[45] Date of Patent: Apr. 26, 1988

[54] MODIFIED CLAY SORBENTS

[75] Inventors: H. Scott Fogler, Ann Arbor; Kerran R. Srinivasan, Livonia, both of Mich.

[73] Assignee: The University of Michigan, Ann Arbor, Mich.

[21] Appl. No.: 801,567

[22] Filed: Nov. 25, 1985

[51] Int. Cl.[4] .......................... B01J 21/16; B01J 20/12
[52] U.S. Cl. ...................................................... 502/84
[58] Field of Search ................. 502/80, 84; 210/416.2, 210/909

[56] References Cited

U.S. PATENT DOCUMENTS

| | | | |
|---|---|---|---|
| 2,408,207 | 9/1946 | Garrison et al. | 252/301 |
| 3,487,928 | 1/1970 | Canevari | 210/40 |
| 4,033,764 | 7/1977 | Colgate et al. | 423/24 |
| 4,040,990 | 5/1977 | Neely | 260/2.1 R |
| 4,060,480 | 11/1977 | Reed et al. | 208/111 |
| 4,176,090 | 11/1979 | Vaughan et al. | 502/84 |
| 4,216,188 | 8/1980 | Shabrai et al. | 423/118 |
| 4,238,364 | 12/1980 | Shabrai | 252/455 R |
| 4,248,739 | 2/1981 | Vaughan et al. | 252/455 R |
| 4,267,055 | 5/1981 | Neely | 210/670 |
| 4,271,043 | 6/1981 | Vaughan et al. | 502/84 |
| 4,363,749 | 12/1982 | Weiss et al. | 252/455 R |
| 4,367,163 | 1/1983 | Pinnavaia et al. | 252/455 R |
| 4,436,645 | 3/1984 | Ceasar | 252/179 |
| 4,436,832 | 3/1984 | Jacobs et al. | 502/84 |
| 4,452,910 | 6/1984 | Hopkins et al. | 502/84 |
| 4,549,966 | 10/1985 | Beall | 210/909 |

FOREIGN PATENT DOCUMENTS

| | | | |
|---|---|---|---|
| 143894 | 9/1980 | Fed. Rep. of Germany | 210/909 |
| 101847 | 9/1978 | Japan | 210/909 |

OTHER PUBLICATIONS

Pinnavaia, Thomas J., Intercalated Clay Catalysts, *Science*, vol. 220, No. 4595, Apr. 22, 1983.

*Primary Examiner*—Carl F. Dees
*Attorney, Agent, or Firm*—Rohm & Monsanto

[57] ABSTRACT

Modified clay is a general purpose sorbent for the removal of trace organic pollutants from process effluent streams. An expandible smectite clay, such as montmorillonite, is placed in an aqueous suspension to expand the layers. The expanded clay is then treated with an excess of a solution of hydroxy-aluminum, in particular, a hydroxy-aluminum solution having an $OH^-/Al$ ratio of about 2.54 and a pH in the vicinity of 4.5. The weight of clay to volume of hydroxy-aluminum solution may vary from about 1:10 and 1:25. The treated clay is filtered, washed, dried, and powdered by techniques well known in the art, and then the entire treatment sequence is repeated. The modified, powdered clay removes organic pollutants from industrial effluent in the ppb-ppq range. In particular, the modified clay is useful in removing traces of PCBs and Dioxin.

9 Claims, No Drawings

MODIFIED CLAY SORBENTS

BACKGROUND OF THE INVENTION

This invention relates generally to systems for removing trace pollutants from industrial effluent streams, such as by a sorbent, and more particularly, to a system for removal of such trace pollutants using a modified clay as the sorbent.

There is a clear, generally known need to reduce the level of pollution in the aquatic environment. A significant first step in effecting reduction of the level of such pollution would be achieved by removing trace organic contaminants, such as polychlorinated biphenyls (PCBs), polychlorinated dioxins (PCDDs), and polychlorinated dibenzofurans (PCDFs). Such trace organic contaminants are found in industrial effluent water as undesirable by-products of chemical manufacturing. For example, 2,3,7,8-Tetrachlorodioxin (2,3,7,8-TCDD) is formed during the production of 2,4,5-Trichlorophenol, which is an ingredient of many pesticides. Even at extremely low concentrations, 2,3,7,8-TCDD is the most toxic isomer of dioxin and is generally referred to as "Dioxin."

A known, highly advantageous technique for removing trace amounts of organic pollutants in very large volumes of waste water, utilizes a sorbent to which the contaminant is adsorbed. The most commonly used adsorbant today is activated carbon, the production of which utilizes a wide variety of carbonaceous starting materials, such as anthracite and bituminous coal, carbonized shells, peat, etc. The various known methods of activating charcoal can be grouped into two categories. The first category includes chemical activation wherein the carbonaceous materials are impregnated with an activating agent and then pyrolyzed. The second category comprises heat treatment processes wherein chars are heated to temperatures between 350° and 1000° C. in the presence of $CO_2$, $N_2$, $O_2$, HCl, $Cl_2$, $H_2O$ and other gases. A portion of the char is burned as the surface area and "activity" of the carbon increases. Modern manufacturing techniques, which include careful monitoring of the activation parameters, yield activated products having high surface areas in a wide range of uniform particle sizes.

In addition to activated charcoal, natural soils and sediments containing various amounts of bound organic carbon or synthetic "zeolite-like" sorbents with specific affinity for rigid, planar aromatic molecules like dioxin have been considered. One known synthetic sorbent is described in U.S. Pat. No. 4,040,990. All of the known systems have significant problems which render them substantially less than ideal for the purpose of removing trace organics from large quantities of water. Activated charcoal and synthetic sorbents are very expensive and therefore do not provide an economical solution to the problem. Natural soils and sediments, however, are less expensive than the activated charcoal and synthetic sorbents, but are not uniform, and in fact exhibit too much variation in binding affinity to be used in large scale technology.

In addition to the systems discussed hereinabove for the disposal of organic pollutants, such as Dioxin, a variety of other methods are known. These include: photolytic dechlorination, microbial degradation, and thermal decomposition. Photolytic dechlorination has been used to detoxify Dioxin-contaminated soil, as well as Dioxin admixed with asphalt and heavy oil. In such situations, the initial concentration of Dioxin was many orders of magnitude higher than is usually present in industrial waste water. For example, the concentration of Dioxin in the contaminated soil, the asphalt, and heavy oil, was in the ppm range, while the concentration in industrial waste water is typically in the ppq range. The process of photolytic dechlorination is disadvantageously characterized by a requirement of high absorption of light photons, and therefore is practical only when high initial concentration of the pollutants is present, and the samples can readily be exposed to light.

As is the case with photolytic dechlorination, the process of microbial degradation also requires the pollutant to be present in high concentration. However, no microorganism has yet been developed which is capable of degrading Dioxin. The process of thermal decomposition requires operating temperatures in excess of 1000° C., and the technology required to implement this process is still in a developmental stage. It is a problem with all three of these processes that they are ineffective when the polluting compound is present in water at extremely low concentrations, illustratively on the order of pptr to ppq.

Swelling clays, generically designated as smectites, have been used widely in the prior art as catalysts, catalyst supports, molecular sieves, adsorbers, and absorbers. The utility of these clays for these purposes is derived from the physical properties of the clay itself. Smectites, such as montmorillonite, have a layered lattice structure in which two-dimensional oxyanions are separated by layers of hydrated cations. The layered structure enable intercalation of layers of a different character between the sheets of the clay structure. In addition, "pillared" clays have been developed wherein intercalated thermally stable cations act as props, or pillars, to support the silicate layers of the clay in the absence of a swelling solvent. The pillar size, or spacing, and hence, the pore size of the clays can be adjusted so as to permit the making of suitable catalysts, catalyst supports, molecular sieves, etc., for various purposes, particularly in the petroleum processing field.

A variety of expanded layer smectite clays, which are based on various cationic species, have been disclosed in the prior art. These include Al, Ti, Fe, Cr, Ni, and Zr. Examples of such clays are described in U.S. Pat. Nos. 4,060,480; 4,176,090, and 4,216,188. The use of inorganic exchange ions to expand smectite layers is described in U.S. Pat. No. 4,060,480. As described in this reference, the clay is treated with hydroxy-aluminum polymers or oligomers in solution, and subsequently the clay is dried and calcined to produce supporting pillars between clay layers. Such pillars serve to maintain the expanded layer state in the clay and leave pores having a rectangular opening configuration, framed by the pillars and the clay layers.

None of the substrates described in the references cited herein are known to be used as compositions which perform as a sorbent for industrial pollutants in an effluent stream. It is to be remembered that the term "adsorption" generally refers to a first step in catalysis and may not necessarily be applicable to the mechanism of a process for removing pollutants from industrial effluents. As is known, a catalyst will adsorb and release. Effluent treatment, however, requires that the composition adsorb the pollutant and retain same.

It is, therefore, an object of this invention to produce an inexpensive system for removing trace organic contaminants which pollute an aquatic environment.

It is also an object of this invention to provide a process for removing trace organic pollutants, typically on the order of between pptr and ppq.

It is another object of this invention to provide a system for removing contaminants from an industrial waste water stream, the contaminants including dioxin, PCBs, PPCDs, and PCDDs.

It is a further object of this invention to provide a material having high sorptive capacity and binding affinity for organic pollutants.

It is still another object of this invention to provide a sorbent material which is inexpensive to use, due to, inter alia, low cost starting materials and high sorptive capacity requiring the use of small quantities of sorbent.

It is yet another object of this invention to provide a process for removing trace organic contaminants which is simple and inexpensive to implement.

It is still a further object of this invention to provide a system for removing trace amounts of contaminants which can be used simply and with existing technology.

It is a still further object of this invention to provide a sorbent material which can easily, and safely, be disposed of after it has been used to remove trace organic pollutants.

SUMMARY OF THE INVENTION

The foregoing and other objects are achieved by this invention which provides a pillared clay composition which is formed by a process including the steps of swelling an expandible clay with a solvent, contacting the swollen clay with an aqueous solution of hydroxy-aluminum, and filtering the mixture thus formed to produce a filter cake. The filter cake is then dried and powdered. After such powdering, the filter cake product is once again subjected to an aqueous solution of hydroxy-aluminum, filtered to produce a further filter cake, dried, and powdered.

In one embodiment of the invention, the expandible clay is a smectite clay, and preferably, montmorillonite. Additionally, the solvent which is used to swell the expandible clay is water.

Preferably, the aqueous solution of hydroxy-aluminum should have an OH$^-$/Al ratio of approximately between 2.0 to 3.1, and preferably approximately 2.54. Additionally, the aqueous solution has a pH in the range of approximately between 3.6 to 5.4, and preferably approximately 4.5.

In accordance with a method aspect of the invention, an expandible clay, illustratively a smectite clay such as montmorillonite is caused to swell. The swollen montmorillonite is subjected to an aqueous solution of hydroxy-aluminum having an OH$^-$/Al ratio of approximately 2.54 and a pH of approximately 4.5. The resulting mixture is filtered to produce a filter cake and washed. The filter cake is then dried and powdered, and once again subjected to an aqueous solution of hydroxy-aluminum. The steps of filtering the mixture to form a filter cake, washing the filter cake, drying the filter cake, and powdering the filter cake are all repeated.

In accordance with a use aspect of the invention, the pillared clay composition which is formed in accordance with the foregoing method is applied to remove organic trace components from industrial effluents. Removal of the trace organic pollutants in the industrial waste effluent is effected by microseparation of the trace pollutants from water.

DETAILED DESCRIPTION OF THE INVENTION

In accordance with the invention, a clay is modified to have an advantageously high sorptive capacity and binding affinity for organic pollutants in water. Clay is particularly suited to the task of treating polluted and contaminated effluents because it is chemically homogeneous, plentiful, and inexpensive. The invention effects a simple, easy to implement modification to the clay. In the practice of the invention, an expandible clay is subjected to a solvent, such as water, so that it swells and the swollen clay is then treated with a polymeric solution of a metal hydroxide, such as hydroxy-aluminum.

In a preferred embodiment of the invention, montmorillonite clay is swollen with distilled water, dried, and treated with an excess of hydroxy-aluminum. Preferably the hydroxy-aluminum solution is 0.3M in water. The exact composition of the hydroxy-aluminum is difficult to determine, however, use of a commercially available solution of hydroxy-aluminum ensures that the solution is preferably "aged", thereby assuring that polymeric hydroxy-aluminum will be available. The ratio of OH$^-$/Al is preferably in the range of approximately between 2.0 and 3.1. In a specific illustrative embodiment of the invention, a commercially available solution of hydroxy-aluminum (Reheis Co.) has been utilized with advantageous results. This known solution has a OH$^-$/Al ratio of 2.54 and a pH of 4.5. The stock solution is available in a 6M concentration which can be suitably diluted with water to obtain the desired concentration.

The smectite clay used in the practice of the invention is advantageously selected to be sodium montmorillonite, which possesses a charge density in the range of 0.8 to 1.1 meq/g smectite. However, any other swelling form of montmorillonite, such as lithium or potassium montmorillonite, can be used in the practice of the invention. Other smectite clays, such as hectorites, beidellites, nontronites, saponites, etc. can be utilized in the production of a modified clay in accordance with the principles of the invention hereof. In a specific illustrative embodiment, Na-montmorillonite (Wyoming SWY-1) obtained from Source Clay Minerals Repository, University of Missouri, Columbia, MO was utilized.

The cross-linking, or pillaring, agent used in this invention is a metal hydroxide, specifically hydroxy-aluminum. The metal component, however, could be chromium or some other metal. Hydroxy aluminum is a polynuclear cation formed according to the following reaction:

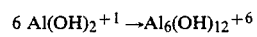

Due to its positive charge, the hydroxy-aluminum cation-exchanges on the negatively charged clay surface. Due to its polymeric size, the hydroxy-aluminum cation is virtually nonexchangeable in conditions of low ionic strength and pHs between 2 and 11. As shown by FTIR studies of the composition produced in accordance with the invention, these positively charged polynuclear cations bind strongly to the interlayer and external surfaces of the clay; the nonexchangeability rendering the kind of stability required for a sorbent in an aqueous environment.

It is difficult to ascertain whether all exchangeable cations are displaced by hydroxy-aluminum, however, the preparatory techniques to be described hereinbelow strive for complete exchange. Pre-swollen clay is subjected to a hydroxy-aluminum solution twice, which solution is greatly in excess of the stoichiometric amount (as high as a 30-fold excess in the illustrative example given hereinbelow).

Altering the $OH^-/Al$ ratio may have some effect on the binding capacity of the modified clay with respect to specific pollutants. The $OH^-/Al$ ratio can be varied in the range of about 2.0 to 3.1, and is preferably 2.54. Lowering the $OH^-/Al$ ratio tends to reduce the size of the polymers formed, thereby leading to a reduction in the crosslinking height. Increasing the $OH^-/Al$ ratio results in Gibbsite formation which tends to precipitate in the spaces between clay crystallites and the interlayer spacing. Gibbsite precipitation may lower the macroporosity of the sorbent.

In a method aspect of the invention, the general procedure for producing a modified clay sorbent for removal of trace pollutants in waste effluent water is as follows:

(1) An expandible-type clay is swollen with a solvent. In a particularly advantageous embodiment of the invention, water is used for this purpose because it is the only inexpensive solvent having a solvation energy which can overcome the combination of Van der Waal's attraction between the clay layers and the electrostatic forces provided by the interlayer exchangeable cations, both of which oppose interlayer expansion. The clay:water ratio is not important since smectites expand to almost infinite interlayer separation as long as the volume of water is large enough to produce such separation. In a specific embodiment, a 1:100 ratio of clay to water is used. Following expansion, the clay is sedimented, illustratively by centrifugation, and the supernatant water is removed by suction prior to the addition of hydroxy-aluminum in the next step.

(2) The swollen clay is contacted with an aqueous solution of hydroxy-aluminum. The ratio of clay weight to volume of hydroxy-aluminum solution is in the range of 1:10 to 1:25. Thus, the solution contains an excess of hydroxy-aluminum. In a specific illustrative embodiment, a 0.3M solution of hydroxy-aluminum having an $OH^-/Al$ ratio of 2.54 and a pH of 4.5 produced advantageous results. This solution was approximately 5% by weight (50 mg/ml) expanded clay. Higher clay concentration reduces interlayer expansion and the lateral movement of individual clay layers, thereby producing a "zeolite-like" micropore structure.

(3) Next, the modified clay is filtered by any known technique to produce a filter cake which is subsequently washed and dried, illustratively in a 60° C. oven for a couple of days or in a 110° C. oven overnight. The dried filter cake is then ground into a powder by any known means, such as by a water-cooled powder grinder.

(4) The powdered, clay product produced thus far is then resubjected to the hydroxy-aluminum treatment, filtered, dried, and powdered again.

The modified clay product produced by the abovedescribed process is effective to remove trace pollutants from an aqueous environment in concentrations as low as pptr to ppq. These trace pollutants include, inter alia, polychlorinated biphenyls, polychlorinated dioxin, polychlorinated dibenzofurans, octachlorodioxin, hexachlorobiphenyl, and 2,3,7,8-tetrachlorodioxin.

The binding affinity or the linear partition coefficient (PC) of a sorbent for a given organic compound in solution is defined as the ratio between the surface concentration of the compound and its solution concentration. The higher the value of PC, the smaller the amount of sorbent required to attain a predetermined level of pollutant removal and the cheaper the overall process is. A value of at least 10,000 is preferable for sorbent PC for effective and efficient operation of sorption technology in pollutant removal from industrial effluent water.

Examples of high binding affinity for octachlorodioxin OCDD as a surrogate of polychlorinated dioxins, and hexachlorobiphenyl (HCB) as a representative of polychlorinated biphenyls, are given hereinbelow as proof that the modified clay is a general purpose sorbent for the removal of trace organic pollutants from process effluent streams.

EXAMPLE 1

Modified clay was manufactured in accordance with the specific illustrative embodiment described hereinabove. A 0.28 mg/ml suspension of the modified clay was mixed with filtered, distilled water. Radiolabeled OCDD was injected under the water and the mixture was agitated for 24 hours. A small amount of Tetrahydrofuran (THF), an organic solvent which is miscible in water, was added to maintain OCDD in soluble form. From the amount of OCDD bound to the modified clay and the amount of OCDD found in solution, a PC of 80,000 was observed.

EXAMPLE 2

The same experimental conditions as described above in Example 1 were repeated using natural montmorillonite as a sorbent. A PC value of 1,500 was observed.

EXAMPLE 3

The experiment of example 1 was performed using HCB in place of OCDD. Since HCB is more soluble in water, THF was not added to the system. The modified clay was observed to have a PC value of 25,000.

In a practical embodiment of the invention, an effective amount of the modified product produced by the inventive method can be stirred into a settling tank into which industrial effluent water is pumped. Following absorption of pollutants, the supernatant liquid, largely devoid of contaminants, can be separated from the sorbent by flocculation or settling. In an alternative embodiment, the effluent water can be continuously pumped through a series of stirred reactors containing the modified clay such that the outlet water will be stripped of pollutants. The used sorbent can be disposed of as a solid environmental waste, or be regenerated.

Although the invention has been described in terms of specific embodiments and applications, persons skilled in the art can, in light of this teaching, generate additional embodiments without exceeding the scope or departing from the spirit of the claimed invention. Accordingly, it is to be understood that the descriptions in this disclosure are proffered to facilitate comprehension of the invention and should not be construed to limit the scope thereof.

What is claimed is:

1. A pillared clay composition formed by a process comprising the steps of:

swelling an expandible clay with a solvent;
contacting the swollen clay with an aqueous solution of hydroxy-aluminum to produce a mixture;
filtering said mixture to produce a filter cake;
drying said filter cake;
powdering said filter cake; and
repeating said steps of contacting, filtering, drying, and powdering.

2. The pillared clay composition of claim 1 wherein said expandible clay is a smectite.

3. The pillared clay composition of claim 2 wherein said smectite is montmorillonite.

4. The pillared clay composition of claim 1 wherein said solvent is water.

5. The pillared clay composition of claim 1 wherein said aqueous solution of hydroxy-aluminum has an $OH^-/Al$ ratio of approximately between 2.0 to 3.1.

6. The pillared clay composition of claim 5 wherein said $OH^-/Al$ ratio is approximately 2.54.

7. The pillared clay composition of claim 5 wherein said aqueous solution has a pH in the range of approximately between 3.6 and 5.4.

8. The pillared clay composition of claim 7 wherein said pH is approximately 4.5.

9. A method of preparing a composition for removing organic trace components from industrial effluents, the method comprising:
forming a swollen montmorillonite;
contacting said swollen montmorillonite with an aqueous solution of hydroxy-aluminum, said solution having an $OH^-/Al$ ratio of approximately 2.54 and a pH of approximately 4.5 to produce a mixture;
filtering said mixture to produce a filter cake;
washing said filter cake;
drying said filter cake;
powdering said filter cake; and
repeating said steps of forming, contacting, filtering, washing, drying, and powdering.

* * * * *